United States Patent
Liu et al.

(10) Patent No.: US 12,511,558 B2
(45) Date of Patent: Dec. 30, 2025

(54) SYSTEM AND METHOD FOR EXPLAINABLE EMBEDDING-BASED RECOMMENDATION SYSTEM

(71) Applicant: Samsung Electronics Co., Ltd., Suwon-si (KR)

(72) Inventors: Ninghao Liu, College Station, TX (US); Yong Ge, Tucson, AZ (US); Li Li, San Jose, CA (US); Xia Hu, College Station, TX (US); Rui Chen, Sunnyvale, CA (US); Soo-Hyun Choi, Kyonggi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 17/318,808

(22) Filed: May 12, 2021

(65) Prior Publication Data

US 2021/0365818 A1    Nov. 25, 2021

Related U.S. Application Data

(60) Provisional application No. 63/027,914, filed on May 20, 2020.

(51) Int. Cl.
   *G06N 5/046*   (2023.01)
   *G06N 5/022*   (2023.01)
   (Continued)

(52) U.S. Cl.
   CPC ............. *G06N 5/046* (2013.01); *G06N 5/022* (2013.01); *G06Q 30/0201* (2013.01); *G06Q 30/0631* (2013.01)

(58) Field of Classification Search
   None
   See application file for complete search history.

(56) References Cited

U.S. PATENT DOCUMENTS

| | | | |
|---|---|---|---|
| 10,579,941 B2 | 3/2020 | Green et al. | |
| 10,877,979 B2 | 12/2020 | Costabello et al. | |
| 11,042,922 B2 | 6/2021 | Onoro Rubio et al. | |
| 2016/0132601 A1 | 5/2016 | Nice et al. | |

(Continued)

FOREIGN PATENT DOCUMENTS

| | | |
|---|---|---|
| CN | 110598118 A | 12/2019 |
| CN | 111582325 A | 8/2020 |

(Continued)

OTHER PUBLICATIONS

Author(s):Wei, Y Title: MMGCN Multi Modal Graph Convlution personalized recommendation Journal: Sesssion 3C[online]. Publication date: 2019. [retrieved on: Jun. 15, 2023 ]. Retrieved from the Internet: < URL: https://www.sciencedirect.com/science/article/pii/S1877042814062934> (Year: 2019).*

(Continued)

*Primary Examiner* — David J Stoltenberg

(57) ABSTRACT

A method includes obtaining, by an electronic device, an interpretation hierarchy generated based on a knowledge graph and behavioral data. The method also includes performing, by the electronic device, graph convolution operations on the interpretation hierarchy to generate one or more embeddings. The method further includes generating, by the electronic device, a recommendation based at least in part on associations between the one or more embeddings. In addition, the method includes providing, by the electronic device, an explanation corresponding to the recommendation.

20 Claims, 10 Drawing Sheets

(51) Int. Cl.
  *G06Q 30/0201* (2023.01)
  *G06Q 30/0601* (2023.01)

(56) References Cited

U.S. PATENT DOCUMENTS

| | | | | |
|---|---|---|---|---|
| 2018/0052913 | A1* | 2/2018 | Gaskill | G06N 5/04 |
| 2019/0187955 | A1* | 6/2019 | Green | G06F 7/24 |
| 2019/0392330 | A1* | 12/2019 | Martineau | G06N 5/04 |
| 2020/0004886 | A1* | 1/2020 | Ramanath | G06F 16/248 |
| 2020/0265466 | A1 | 8/2020 | Cheng et al. | |
| 2020/0311798 | A1* | 10/2020 | Forsyth | G06Q 30/0643 |
| 2021/0027178 | A1 | 1/2021 | Ding et al. | |
| 2021/0312134 | A1* | 10/2021 | Creed | G06N 20/00 |
| 2021/0365818 | A1 | 11/2021 | Liu et al. | |
| 2022/0335041 | A1* | 10/2022 | Kwatra | G06F 16/248 |
| 2023/0385607 | A1* | 11/2023 | Biswas | G06N 3/0464 |

FOREIGN PATENT DOCUMENTS

| | | |
|---|---|---|
| CN | 108984711 B | 9/2020 |
| CN | 112085559 A | 12/2020 |
| CN | 112232925 A | 1/2021 |
| CN | 112632296 A | 4/2021 |
| KR | 10-2342678 B1 | 12/2021 |

OTHER PUBLICATIONS

Author(s):FuY Title: Fairness aware explainable recommendation over knowledge graphs Journal: ACM[online]. Publication date : Jul. 2020.[retrieved on: Jan. 5, 2024 ]. Retrieved from the Internet: < URL: https://dl.acm.org/doi/abs/10.1145/3397271.3401051> (Year: 2020).*

Author(s):Goyal Title: Graph embeddings techniques Journal: Elsevier[online]. Publication date: 2018.[retrieved on: Aug. 24, 2024 ] Retrieved from the Internet: < URL: https://www.sciencedirect.com/science/article/pii/S0950705118301540> (Year: 2018).*

Author(s):Shi Title: Building segmentation through a gated graph convolution neural network Journal: Elsevier[online]. Publication date: 2019.[retrieved on: Mar. 5, 2025 ]. Retrieved from the Internet: < URL: https://www.sciencedirect.com/science/article/pii/S092427161930259X?via%3Dihub > (Year: 2019).*

Author(s):Wang Title: Knowledge graph attention network for recommendation Journal: ACM[online]. Publication date: 2019. [retrieved on: Mar. 5, 2025 ]. Retrieved from the Internet: < URL: https://dl.acm.org/doi/abs/10.1145/3292500.3330989 > (Year: 2019).*

Kumar et al. Predicting Dynamic Embedding Trajectory in Temporal Interaction Networks, arXiv: 1908.01207v1 [cs.SI] Aug. 3, 2019.*

Xu et al. Product Knowledge Graph Embedding for E-commerce, arXiv:1911.12481v1 [cs.LG] Nov. 28, 2019.*

International Search Report and Written Opinion of the International Searching Authority dated Jul. 27, 2022 in connection with International Patent Application No. PCT/KR2022/005206, 10 pages.

Anonymous Authors, "Explainable Recommender Systems via Resolving Learning Representations", CIKM '20: The 29th ACM International Conference on Information and Knowledge Management, Oct. 19-23, 2020, 10 pages, 2020 Association for Computing Machinery, Galway, Ireland.

* cited by examiner

SYSTEM AND METHOD FOR EXPLAINABLE EMBEDDING-BASED RECOMMENDATION SYSTEM

CROSS-REFERENCE TO RELATED APPLICATIONS AND PRIORITY CLAIM

This application claims priority under 35 U.S.C. § 119(e) to U.S. Provisional patent application No. 63/027,914 filed on May 20, 2020, which is hereby incorporated by reference in its entirety.

TECHNICAL FIELD

This disclosure relates generally to recommendation systems. More specifically, this disclosure relates to techniques for an explainable recommendation model for more effective and transparent recommendation processes.

BACKGROUND

Recommendation systems play a pivotal role in a wide range of web applications and services, such as in terms of distributing online content to targets who are likely to be interested in it. Recommendation techniques are also applicable to many relevant fields, such as user response prediction, like click-through-rate (CTR) prediction and conversion rate (CVR) prediction, and so forth in digital advertising. Many efforts in these domains have been emphasized with respect to developing more effective models to achieve better performance. In particular, embedding techniques have been widely used to improve performance in recent years. Unfortunately, the resulting recommendation systems are generally considered as black boxes, and it is difficult to understand why certain recommendation results are generated.

SUMMARY

This disclosure provides techniques for an explainable embedding-based recommendation system.

In a first embodiment, an electronic device includes at least one memory configured to store a database. The electronic device also includes at least one processor configured to obtain an interpretation hierarchy generated based on a knowledge graph and behavioral data. The at least one processor is also configured to perform graph convolution operations on the interpretation hierarchy to generate one or more embeddings. The at least one processor is further configured to generate a recommendation based at least in part on associations between the one or more embeddings. In addition, the at least one processor is configured to provide an explanation corresponding to the recommendation.

In a second embodiment, a method includes obtaining, by an electronic device, an interpretation hierarchy generated based on a knowledge graph and behavioral data. The method also includes performing, by the electronic device, graph convolution operations on the interpretation hierarchy to generate one or more embeddings. The method further includes generating, by the electronic device, a recommendation based at least in part on associations between the one or more embeddings. In addition, the method includes providing, by the electronic device, an explanation corresponding to the recommendation.

In a third embodiment, a non-transitory machine-readable medium contains instructions that when executed cause at least one processor of an electronic device to obtain an interpretation hierarchy generated based on a knowledge graph and behavioral data. The medium also contains instructions that when executed cause the at least one processor to perform graph convolution operations on the interpretation hierarchy to generate one or more embeddings and generate a recommendation based at least in part on associations between the one or more embeddings. The medium also contains instructions that when executed cause the at least one processor to provide an explanation corresponding to the recommendation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as Samsung HomeSync™, Apple TV™, or Google TV™), a gaming console (Xbox™ PlayStation™), such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
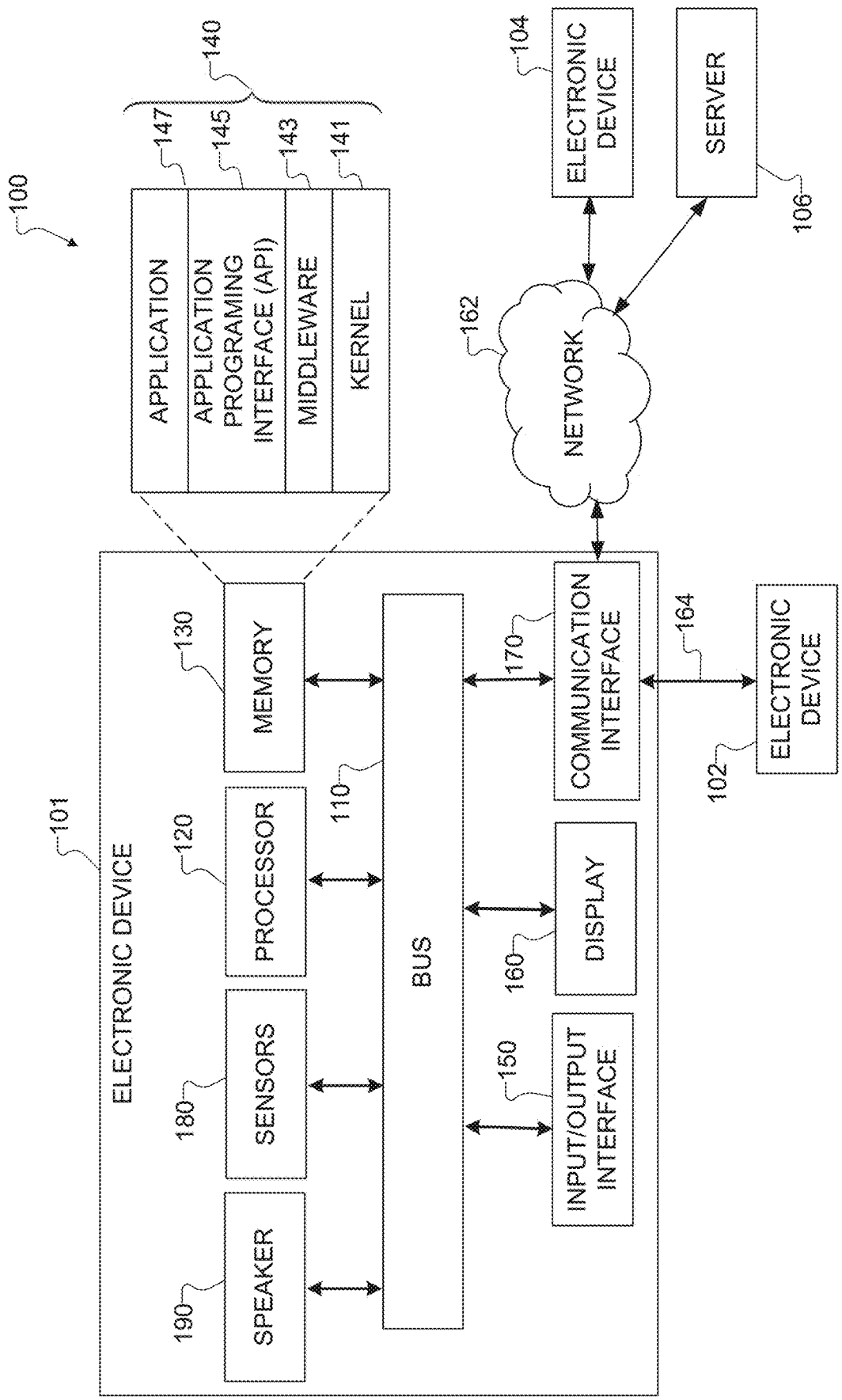
FIG. 1 illustrates an example network configuration including an electronic device in accordance with this disclosure.

FIGS. 1 through 10, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, recommendation systems play a pivotal role in a wide range of web applications and services, such as in terms of distributing online content to targets who are likely to be interested in it. Recommendation techniques are also applicable to many relevant fields, such as user response prediction, like click-through-rate (CTR) prediction and conversion rate (CVR) prediction, and so forth in digital advertising. Many efforts in these domains have been emphasized with respect to developing more effective models to achieve better performance. In particular, embedding techniques have been widely used to improve performance in recent years. Unfortunately, the resulting recommendation systems are generally considered as black boxes, and it is difficult to understand why certain recommendation results are generated.

In practice, the explanation capability of a recommendation system is generally indispensable. For example, in an advertisement service, an explainability of the recommendation models will substantially benefit many stakeholders, such as (1) users (to promote the persuasiveness of the recommendation results and boost user satisfaction); (2) engineers (to help machine-learning engineers validate, diagnose, and improve recommendation algorithms); and (3) other stakeholders (to help, for example, PM/business/sales/clients understand how models work and promote model adoptions).

Recommendation systems and related techniques play a fundamental role in various applications in filtering massive amounts of information and matching user interests. While many efforts have been devoted on developing more effective models in various scenarios, the exploration of the explainability of recommendation systems is running behind. Explanation acts as the bridge between humans and models and could help improve user experience and discover system defects for developers. One possible goal here is to recommend items to users who are more likely to respond. Many advertisement services rely on recommendation techniques to recommend the items that users are most likely to click and/or install. Improving the recommendation accuracy is just one side of the problem. The other is the explainability of recommendation systems, which addresses the problem of "why": besides providing recommendation results, they also give reasons to clarify why such results are derived. Explainability is valuable to various real businesses.

Certain recommendation algorithms are normally based on embedding techniques. By far, it is not clear how to provide explainability for embedding learning frameworks. Embodiments of the present disclosure propose an explainable recommendation model through improving the transparency of a representation learning process. Specifically, to overcome the representation entangling problem in traditional models, certain embodiments revise traditional graph convolution to discriminate information from different layers. Also, each representation vector can be factorized into several segments, where each segment relates to one semantic aspect in data. Certain embodiments use a model in which factor discovery and representation learning are simultaneously conducted. Additionally, certain embodiments are able to handle extra attribute information and knowledge. In this way, a proposed model in accordance with this disclosure can learn interpretable and meaningful representations for users and items. Unlike traditional methods that need to make a trade-off between explainability and effectiveness, the performance of the proposed explainable model according to certain embodiments may not be negatively affected after considering explainability.

Embodiments of this disclosure also provide techniques to design explainable recommendation systems, especially recommendation systems based on embedding techniques. Embodiments of the present disclosure also provide the capability of explainability for embedding-based recommendation systems. Embodiments of the present disclosure provide a series of new features that can be used to build an explainable recommendation model through promoting the transparency of latent (embedding) representations. Unlike traditional methods that need to make a trade-off between explainability and accuracy, embodiments of the present disclosure may not negatively affect accuracy after considering explainability.

Certain embodiments of the present disclosure provide an explainable recommendation model through promoting the transparency of latent representations (e.g., embeddings). To provide explainability for embedding-based recommendation techniques, three fundamental elements are summarized that help make a model more interpretable: discrete conceptualization of input data format, middle-level representations, and output attribution. Embodiments of the present disclosure provide for users, items, and attribute entities to be processed as nodes in a graph. Furthermore, the efforts on interpretable recommendation can be split into three parts: (1) the disentanglement of the interactions between latent representations in different layers; (2) the identification of multiple semantic factors automatically from data; and (3) the division of latent dimensions into segments according to their information source (i.e., node types) and affiliated factors. The first part can be achieved via graph convolution networks (GCNs). The second and third aspects can be achieved through an architecture design, where different dimensions of latent representations focus on different aspects of data. Embodiments of the present disclosure jointly conduct factor discovery and representation learning. In this way, certain embodiments are able to depict how information flows from input features through these latent states to prediction results. Embodiments of the proposed model achieve good performance in an experimental evaluation showing that effectiveness is not sacrificed for interpretability. Finally, besides visualizing explanations, embodiments have been shown where explanation accuracy can be quantitatively measured.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101—mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

In order to increase understanding of the embedding-based recommendation techniques, systems, and methods disclosed here, three input-data/output-attribution/middle-level (IOM) elements are provided to make a recommendation model more interpretable: discrete conceptualization of input data format, middle-level representations, and output attribution. Certain embodiments of the present disclosure are designed based on these three IOM elements. To address the input data format requirement, certain embodiments of the present disclosure provide an interpretation hierarchy with users, items, and knowledge graph (KG) entities so that the recommendation results provided to users can be explained by KG entities and interacted items. For middle-level representations, an embedding is disentangled into different segments based on information sources and semantic factors. Information sources can include users, items, and KG entities. Additionally, semantic factors can include articles such as clothes, electronics, and daily necessities. Additionally, in certain embodiments, the information flow is confined to the same information source and the same semantic factor. Certain embodiments also provide for an output attribution in which an explainable model is displayed, instead of developing post-hoc methods, to provide human comprehensible rationales for recommendations.

Figure 2B:
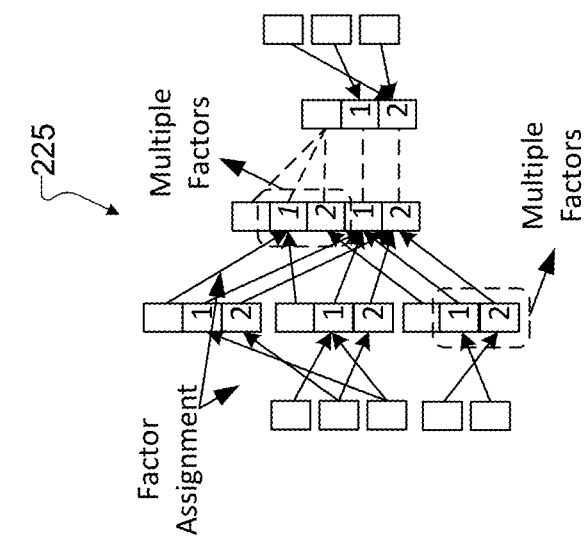
FIG. 2B illustrates an explainable embedding-based recommender model in accordance with this disclosure.
Figure 2A:
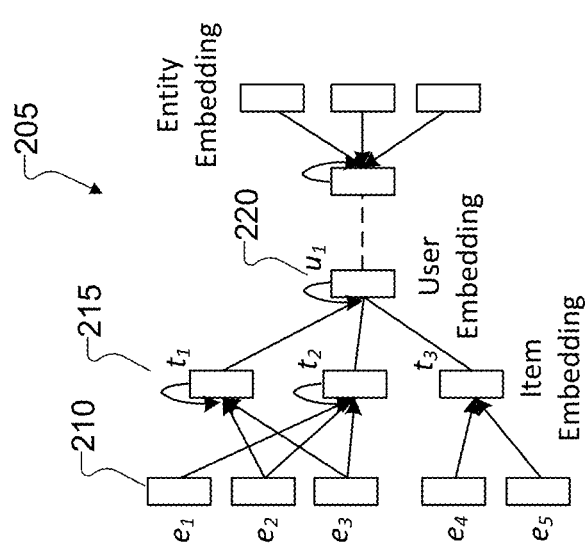
FIG. 2A illustrates a basic embedding-based recommender system in accordance with this disclosure.

FIG. 2A illustrates a basic embedding-based recommender system in accordance with this disclosure. The basic embedding-based recommender system shown in FIG. 2A is for illustration only, and other embodiments could be used without departing from the scope of the present disclosure.

In the example illustrated in FIG. 2A, information propagation for a GCN 205 is depicted. One or more knowledge graph embeddings ($e_n$) 210 are fed into respective item embeddings ($t_n$) 215, whose outputs then feed into a user embedding (un) 220. An embedding of node $\upsilon$ is denoted as $z_\upsilon$. Under the conventional GCN 205 and according to Equation 1 below:

$$z_j \leftarrow \sigma\left(\sum_{v_i \in N_j \cup \{v_j\}} a_{i,j} W_{zi}\right) \tag{1}$$

in which $z_j$ is an embedding of node $v_j$, $N_j$ denotes the neighbors of $v_j$, $\sigma$ is the activation function, $a_{i,j}$ is the attention score, and $W_{zi}$ is a bilinear mapping matrix; the embeddings of user u and item t on the final GCN layer are computed as:

$$z_u \leftarrow \text{COMBINE}(z_u, \text{AGGREGATE}(\{z_t: t \in N_u \subseteq T\}))$$

$$z_t \leftarrow \text{COMBINE}(z_t, \text{AGGREGATE}(\{z_e: e \in N_t \subseteq \varepsilon\})) \tag{2}$$

where $N_u$ denotes the set of items with which the user has interacted, T denotes the entire item set, $N_t$ denotes the knowledge graph entities connected to item t, and E denotes the entire entity set.

It is noted that the information flow direction is restricted. An item embedding $z_t$ receives information from knowledge graph entities, as well as its own embedding on the lower GCN layer. Similarly, a user embedding $z_u$ receives information from itself on the lower layer, the items with which there has been an interaction, and knowledge graph entities as second-order connections. Finally, top-layer $z_u$ and $z_t$ engage in computing a recommendation prediction $\hat{Y}_{u,t}$. Common COMBINE( ) operations include summation or concatenation followed by transformation, while common AGGREGATE( ) operations include summation and mean operation. In accordance with this disclosure, in the recommendation model, traditional COMBINE( ) and AGGREGATE( ) operations are modified to resolve information propagation between representations.

FIG. 2B illustrates an explainable embedding-based recommender model in accordance with this disclosure. The explainable embedding-based recommender model shown in FIG. 2B is for illustration only, and other embodiments could be used without departing from the scope of the present disclosure. The explainable embedding-based recommender model can be incorporated in or executed by one or more processors in a computing system, such as in the electronic device 101 or server 106.

In certain embodiments, instead of merging information from lower-level representations, the process maintains $z_v$ and AGGREGATE($\{z_v : v' \in N_v\}$) separate if v and v' are different types of nodes. Specifically, the item embedding is defined as:

$$z_t = z_t^{slf} \| z_t^{ent} \quad (3)$$

where:

$$z_t^{ent} = \text{AGGREGATE}(\{z_e^{slf} : e \in N_t \subseteq \varepsilon\}) \quad (4)$$

Here, $z_t^{slf}$ denotes an item self's bottom-level embedding, $z_t^{ent}$ is the embedding learned from associated knowledge graph entities' embeddings $z_e^{slf}$, and $\|$ denotes concatenation.

Similarly, for each user embedding $z_u$, the user embedding receives information from both item embeddings and knowledge graph entity embeddings that describe those items. Therefore, the user embedding $z_u$ is defined as:

$$z_u = z_u^{slf} \| z_u^{itm} \| z_u^{ent} \quad (5)$$

where:

$$z_u^{itm} = \text{AGGREGATE}(\{z_t^{slf} : t \in N_u \subseteq T\})$$

$$z_u^{ent} = \text{AGGREGATE}(\{z_t^{ent} : t \in N_u \subseteq T\}) \quad (6)$$

Here, $z_u^{itm}$ describes the user through the historical items with which the user has interacted, while $z_u^{ent}$ describes the user through knowledge graph entities.

In the example illustrated in FIG. 2B, an explainable embedding-based GCN 225 after resolving information sources and factors is depicted. In contrast to the GCN 205, the explainable embedding-based GCN 255 segments embeddings by node types, semantic factors of items and semantic factors of KG entities. Instead of directly aggregating information from items or entities without distinguishing their natures or semantics, the process first assigns low-level embeddings into different factors and then sends information accordingly. Specifically, an item-side aggregation is defined as:

$$z_t^{ent} = \|_{c=1}^{C_1} z_t^{ent,c}, \text{ where } z_t^{ent,c} = g\left(\sum_{e \in N_t} \frac{p(e, c)}{|N_t|} z_e^{slf}\right) \quad (7)$$

Here $p(e, c) \in [0, 1]$ denotes the affiliation degree between entity e and factor c. Additionally, $p(e, c) \in [0, 1]$ is calculated as the contribution of a connected entity e on factor c ($1 \leq c \leq C_1$). The term N is the set of entities connected to the item t, and g is a non-linear mapping module. Also, the user-side aggregation is defined as:

$$Z_u^{itm} = \|_{c=1}^{C_2} z_u^{itm,c}, \text{ where } z_u^{itm,c} = g\left(\sum_{t \in N_u} \frac{p(t, c)}{|N_u|} z_t^{slf}\right) \quad (8)$$

$$Z_u^{ent} = \|_{c=1}^{C_1} z_u^{ent,c}, \text{ where } z_u^{ent,c} = \sum_{t \in N_u} \frac{1}{|N_u|} z_t^{ent,c} \quad (9)$$

Here, the term $N_u$ is the set of items with which the user has interacted, $p(t, c) \in [0, 1]$ denotes the affiliation degree between item t and factor c. Also, g is a nonlinear mapping module. The item-based and entity-based embeddings can have different numbers of factors ($C_2$ vs. $C_1$). Each of $z_u^{slf}$, $z_t^{slf}$, $z_e^{slf}$, $p(e, c)$, and $p(t, c)$ are learnable parameters.

This design is based on the principle that: (1) $z_v^{slf}$ will first be assigned to some factors c according to p(v, c) scores and then contribute to the corresponding higher-level embeddings after nonlinear mapping; and (2) for those embeddings that are already factorized (i.e., $z_t^{ent,c}$), those embeddings will directly contribute to higher-level counterparts (i.e., $z_u^{ent,c}$) within the same factor c. It is worth noting that two index sets $\{c | 1 \leq c \leq C_1\}$ and $\{c | 1 \leq c \leq C_2\}$ are included because these index different factors. Also, if there are more layers of entity nodes, the embeddings from the additional layers could be learned via normal GCN, because entity nodes in different layers are still in the same type.

Figure 3:
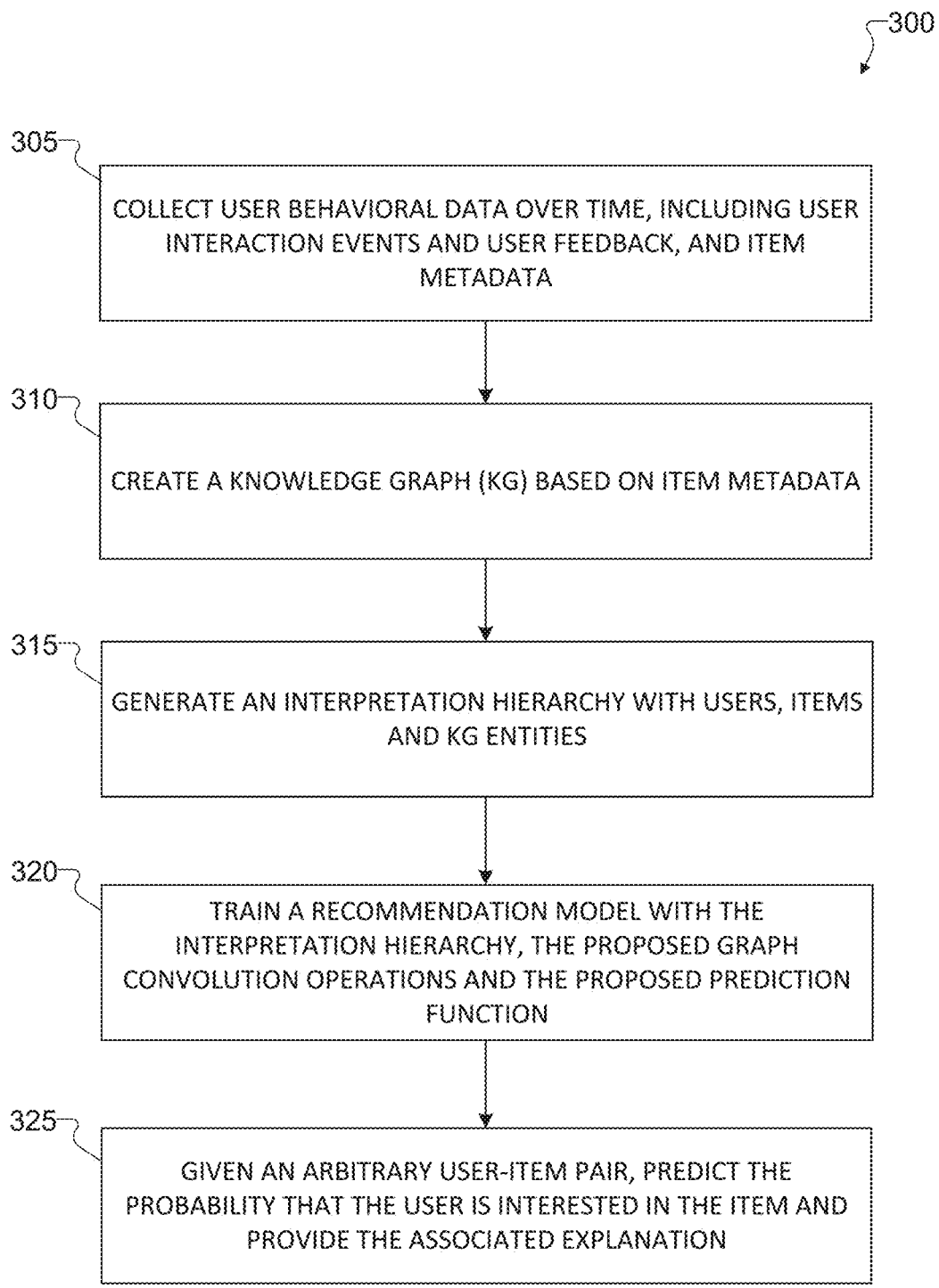
FIG. 3 illustrates an example process for generating an explainable recommendation model in accordance with this disclosure.

FIG. 3 illustrates an example process 300 for generating an explainable recommendation model in accordance with this disclosure. While FIG. 3 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 300 depicted can be implemented by one or more processors in a recommendation system, such as by one or more processors 120 of an electronic device 101 or server 106. In certain embodiments, one or more steps of the process 300 are performed by one or more processors in an electronic device or server performing a machine learning (i.e., an artificial intelligence) process.

In operation 305, user behavioral data is collected over time. The user behavioral data includes user interaction events, such as when a user interacted with an item at a particular timestamp, and optionally context data associated with the event, user feedback, (such as click, install, or in-app purchase), and the like. The server 106, in the recommendation system, logs a user's various behavior events. For example, the server 106 logs when a user is browsing in a video database, such as NETFLIX, clicking a movie, watching a movie, rating a movie, and the like, and stores such data for later processing. Also collected are the items' metadata, such as the attributes of items. In addition, the server 106 can clean, preprocess, and aggregate all data so that effective feature engineering can be performed. User behavior logs are normally collected on a user device, such as via the electronic device 101, in real time and transferred to the server 106 in real time or every few hours. Data cleaning, preprocessing, and user-item interaction aggregation are normally done on a daily basis. As a result, the server 106 can create new user-item interactions and update existing user-item interactions after a daily processing. In certain embodiments, the recommendation system may include a data retention policy. For example, the server 106 may only use the logs from the last two months for recommendation. In this case, the user-item interactions that happened two months ago will be removed during daily processing.

Figure 4:
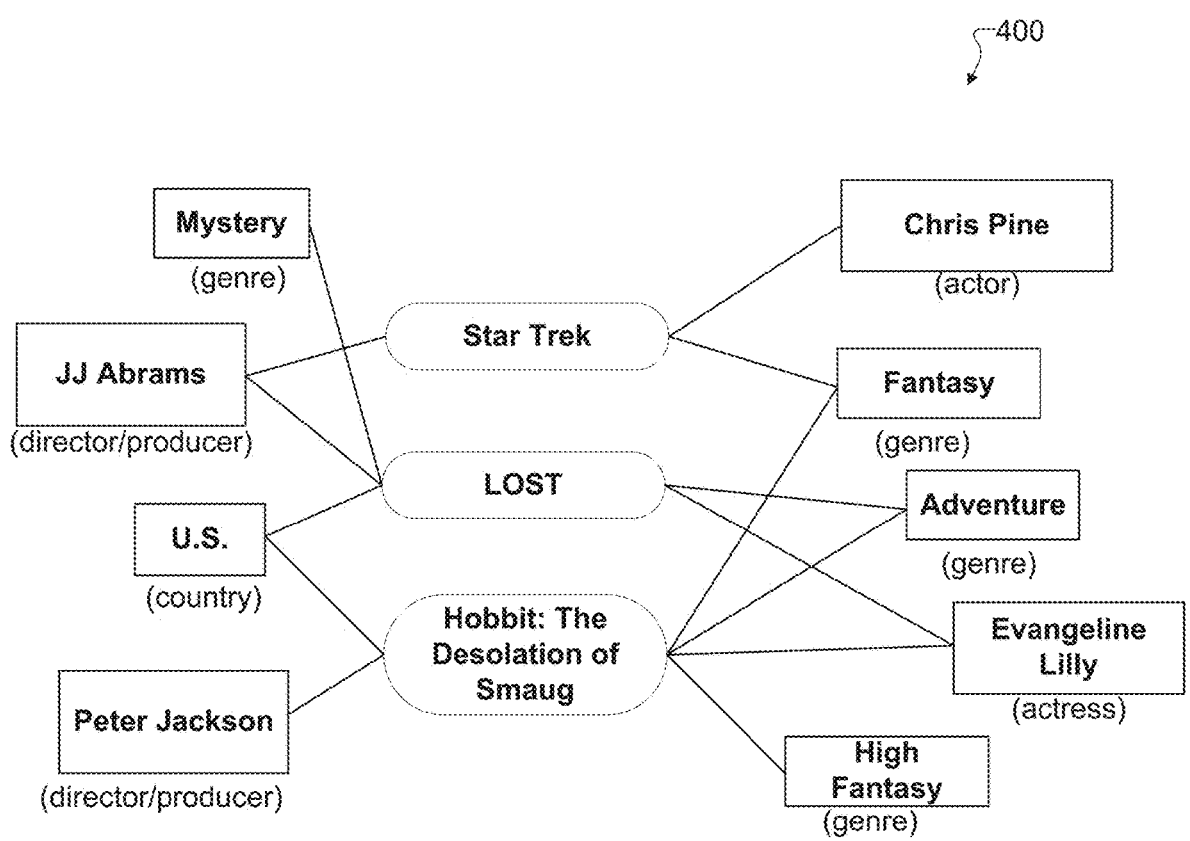
FIG. 4 illustrates an example domain knowledge graph in accordance with this disclosure.

In operation 310, the server 106 constructs a knowledge graph (KG) for all items based on the items' metadata so that they are interconnected via various relations. The server 106 cleans and preprocesses the stored raw logs and then aggregates the preprocessed data by grouping the preprocessed data into user-item interaction pairs. In this case, the server 106 can obtain all user-item interactions that occurred in a previous time period. For example, depending upon the application domain, the server 106 creates the KG to create semantic linkages between items via different attributes. The application domain can include a restaurant recommendation, a movie recommendation, a product recommendation, a service recommendation, or the like. The server 106 can create different types of attributes according to the underlying domain. For example, FIG. 4 illustrates an example domain knowledge graph 400 in accordance with this disclosure, namely a simple knowledge graph for movie recommendation.

The server 106 creates a domain knowledge graph when a request or instruction to launch the recommendation system has been received or occurs. After that, the knowledge graph is relatively static. The server 106 updates the knowledge graph when new items appear or when new attributes appear. Similarly, when some items are no longer available in the market or some attributes are no longer applicable, the server 106 deletes the respective items or attributes from the knowledge graph. The entire knowledge graph will not be deleted because the server 106 still requires the knowledge graph to provide the explainable recommendation service.

Figure 5:
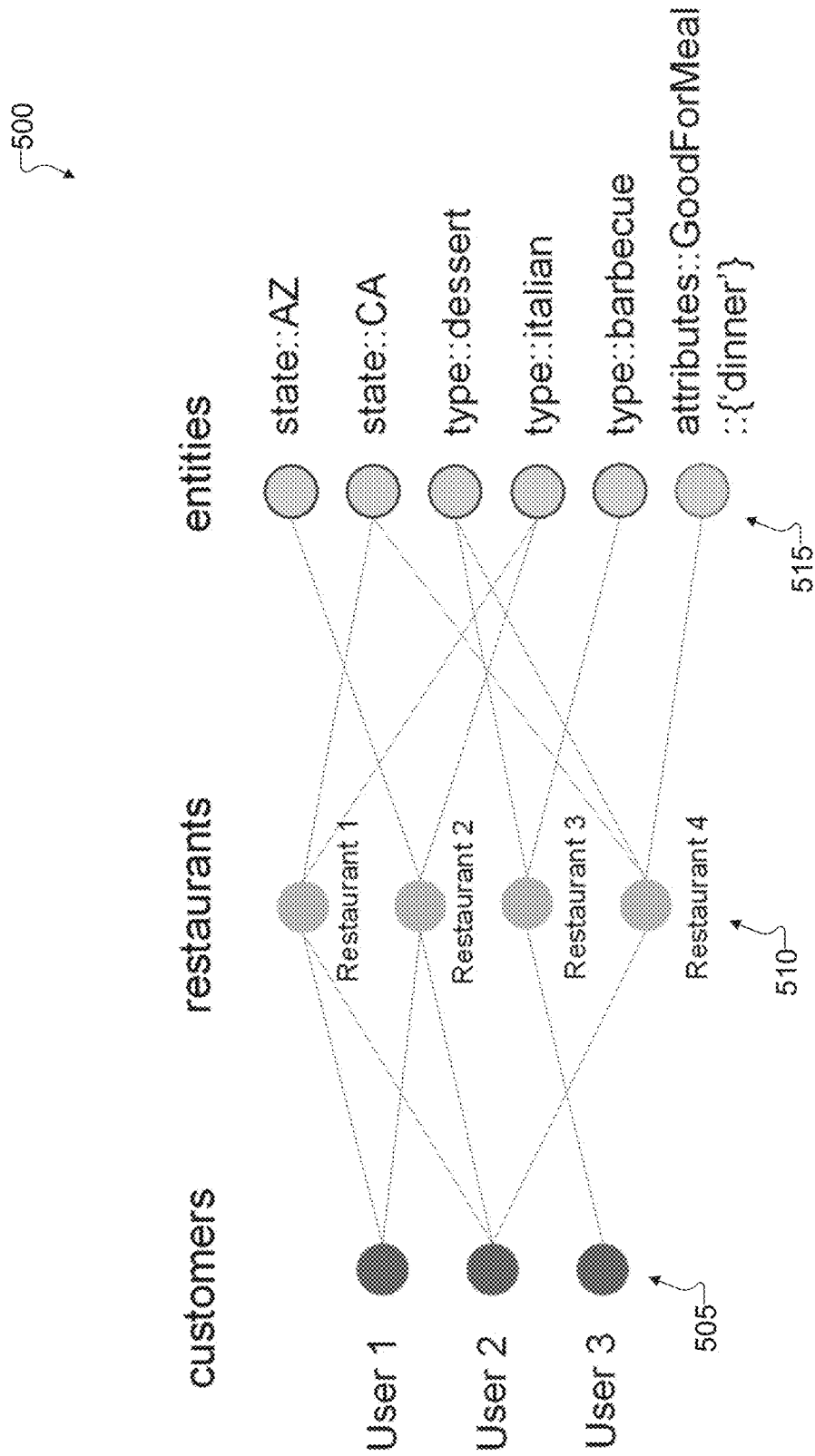
FIG. 5 illustrates an example interpretation hierarchy in accordance with this disclosure.

In operation 315, an interpretation hierarchy is constructed. With the constructed knowledge graph, the recommendation system builds an interpretation hierarchy with users, items, and KG entities being in different layers. This interpretation hierarchy will be input to the recommendation model. The interpretation hierarchy contains all users and all items in the processed user-item interactions as nodes. FIG. 5 illustrates an example interpretation hierarchy 500 in accordance with this disclosure. If an interaction exists between a user and an item, there is an edge connecting a user node 505 and an item node 510. All item nodes in the hierarchy are also connected to all knowledge graph entities 515, e.g., attributes, in the constructed knowledge graph. Additionally, since the user-item interactions are updated on a daily basis, the input interpretation hierarchy will also be updated daily and contain user-item interactions that happened in, for example, the past two months.

Figure 6A:
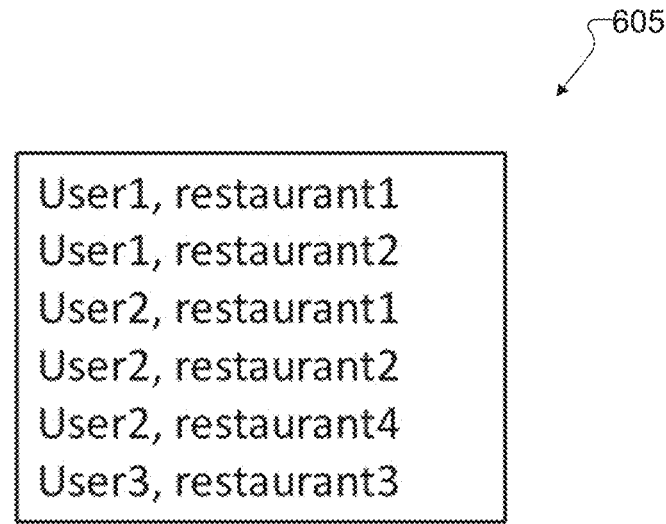
FIGS. 6A and 6B illustrate example interpretation hierarchy files in accordance with this disclosure.
Figure 6B:
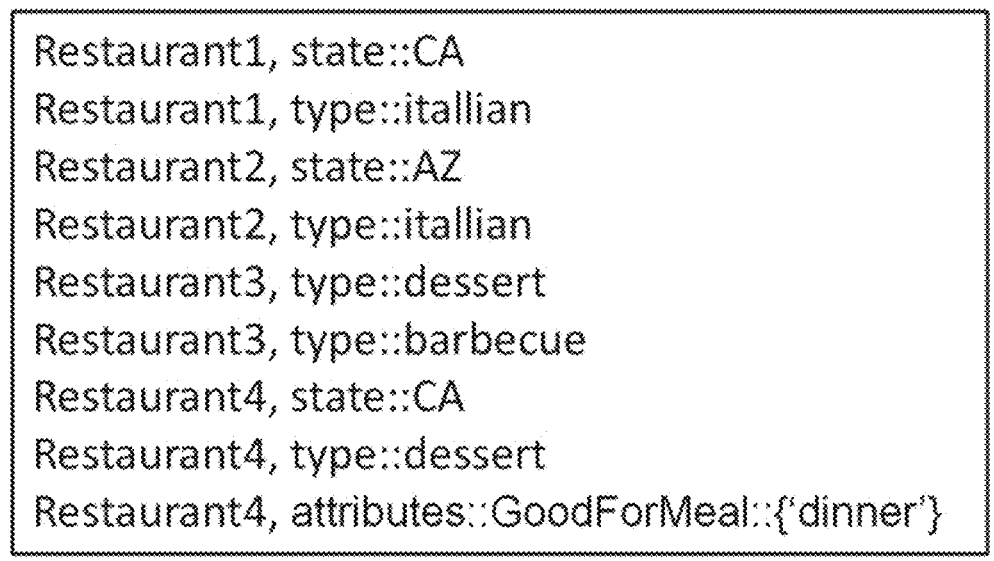

In certain embodiments, the server 106 can save the interpretation hierarchy in two files. The first file 605 stores all (user, item) pairs and the second file 610 stores all (item, entity) pairs. FIGS. 6A and 6B illustrate example interpretation hierarchy files 605 and 619 in accordance with this disclosure.

In certain embodiments, the server 106 obtains the interpretation hierarchy from an external source. For example, the knowledge graph, behavioral data, and item data can all exist in different devices or systems. The server 106 can obtain the interpretation hierarchy that was generated based on a knowledge graph and behavioral data, which may have been generated based on a user's activities via the electronic device 101.

In operation 320, a recommendation model is trained. The recommendation system trains the recommendation model by using graph convolution operations to generate user and item embeddings and the proposed prediction function to make predictions. For example, the server 106 can use a variational autoencoder to perform graph convolution operations as depicted in the example illustrated in FIG. 7.

Figure 7:
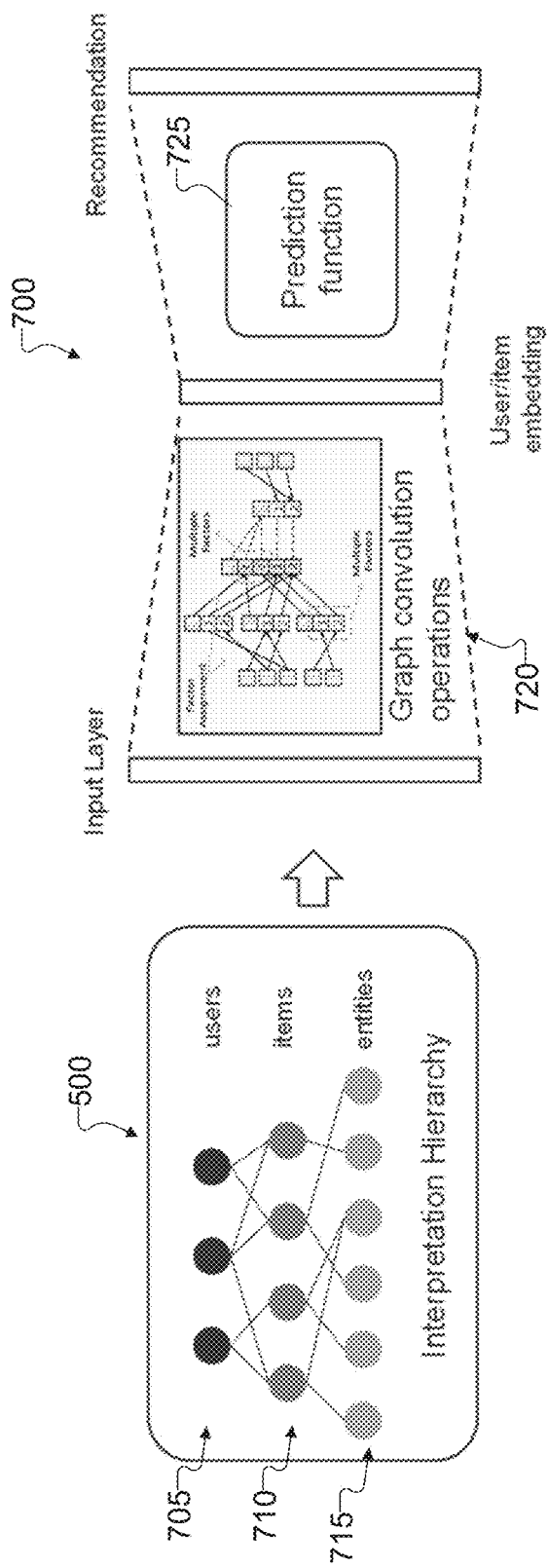
FIG. 7 illustrates an example variational autoencoder in accordance with this disclosure.

FIG. 7 illustrates an example variational autoencoder 700 in accordance with this disclosure. The embodiment of the variational autoencoder 700 shown in FIG. 7 is for illustration only. Other embodiments could be used without departing from the present disclosure.

For the interpretation hierarchy, note that the recommendation system treats user nodes, item nodes, and KG entity nodes as concepts. Different concepts are assigned to different levels of the interpretation hierarchy 500. In this example, the topmost level includes user nodes 705, the second level includes item nodes 710, and the bottom level includes KG entity nodes 715. There is a link between a user node and an item node if there is an observed interaction between them, a link between an item node and an entity node if the item's quality or attribute is described by the entity, and a link between an entity node and an entity node if there is a relation between them in the knowledge graph. The embedding of a concept can be interpreted by the embeddings of its connected concepts in lower levels. Low-level concepts tend to be simple, while high-level concepts are complex and composite. Lower-level concepts can be regarded as the basis to represent higher-level ones. The server 106 uses the interpretation hierarchy 500 as the input to the variational autoencoder 700.

In FIG. 7, the server 106 performs interpretable graph convolution operations 720 to generate user and item embeddings from the interpretation hierarchy 500. In certain embodiments, the server 106 performs two or more convolutions in which (1) a first convolution operation is performed to generate item entity embeddings and user embeddings via separating information from different types of nodes and (2) a second convolution operation is performed to aggregate item embeddings and user embeddings by introducing fine-granular item and knowledge graph entity factors. The explainability comes from the design of disentangling embeddings by information sources (e.g., users, items, or KG entities) and semantic factors automatically extracted from data. The server 106 performs two basic operations: AGGREGATE( ) and COMBINE( ). In the COMBINE operation, the embedding of an item $z_t$ is defined as the concatenation of its item-based embedding $z_t^{slf}$ and its entity-based embedding $z_t^{ent}$. The term $z_t^{ent}$ represents the item as an aggregation of the embeddings of all entities connected to the item. The embedding of a user $z_u$ is defined as the concatenation of its user-based embedding $z_u^{slf}$, item-based embedding $z_u^{itm}$, and the entity-based embedding $z_u^{ent}$. The term $z_u^{itm}$ represents a user through the historical items with which he or she has interacted, and $z_u^{ent}$ describes a user using knowledge graph entities. The server 106 generates $z_t^{ent}$, $z_u^{itm}$, and $z_u^{ent}$ in the AGGREGATE operation. For example, the server 106 calculates $z_u^{ent}$ using Equation (7) above.

Here, $z_t^{ent}$ is formulated as the concatenation of embeddings from different semantic factors. The server 106 calculates $z_u^{itm}$ and $z_u^{ent}$ using Equations (8) and (9) above.

Returning to FIG. 3, in operation 325, a prediction is provided. Using the trained model, the recommendation system can predict a probability that a given user is interested in a given item and provide an explanation of the recommendation result, such as in a visual or textual form. For example, the server 106 can execute a prediction function 725 that considers item-based and entity-based information separately and factor-wise similarity. The prediction function 725 can be given by Equation (10) below.

$$p(Y_{u,t}|z_u, z_t) \propto \sum_{c=1}^{c_1} p(t,c) \, \exp(\langle z_u^{itm,c}, z_t^{slf} \rangle) + \sum_{c=1}^{c_2} \exp(\langle z_u^{ent,c}, z_t^{ent,c} \rangle) \quad (10)$$

Here:

$$\sum_{c=1}^{c_1} p(t,c) \, \exp(\langle z_u^{itm,c}, z_t^{slf} \rangle) \quad (11)$$

is an item based term, and:

$$\sum_{c=1}^{c_2} \exp(\langle z_u^{ent,c}, z_t^{ent,c}\rangle) \quad (12)$$

is an entity based term. The expression $\langle \cdot,\cdot \rangle$ is an inner product. In particular, unlike previous methods, the server 106 does not use $\langle z_u^{slf}, z_t^{slf}\rangle$ to generate the prediction results because use of these terms may negatively impact the explainability of the model. Instead, in some embodiments, the server 106 first computes the user-item similarity using the prediction function 725. The similarity between a user and an item is determined by two aspects corresponding to the two terms in the prediction function shown in Equation (10). The first aspect is the similarity between the current item and the historical items interacted by the user. The second aspect is the similarity between the properties (i.e., knowledge entity attributes) of the current item and the properties of the historical items.

In certain embodiments, the server 106 can provide one or more of the recommendation, the prediction, or the explanation in a visual format. That is, the server 106 can communicate with the electronic device 101 to cause the electronic device 101 to display a visual image corresponding to the recommendation to the user. For example, the electronic device 101 can display an image of a recommended movie, an image of a recommended restaurant, or the like. Additionally, the server 106 can cause an attached or external display to display an image, via color, numbers, graphics, charts, and the like, to illustrate a probability that the user will accept the recommendation. Additionally, the server 106 can cause the display to display one or more images, icons, or the like corresponding to the entities and items that formed the basis for the recommendation. The server 106 can provide graphic associations of the items and entities and graphic weightiness, such as a heat map or the like, to further illustrate the explanation for the recommendation. In certain embodiments, one or more of the recommendation, prediction, or explanation is provided via a plain text. In certain embodiments, one or more of the recommendation, predication, or explanation is provided via a combination of plain text and graphic images or icons.

Figure 8:
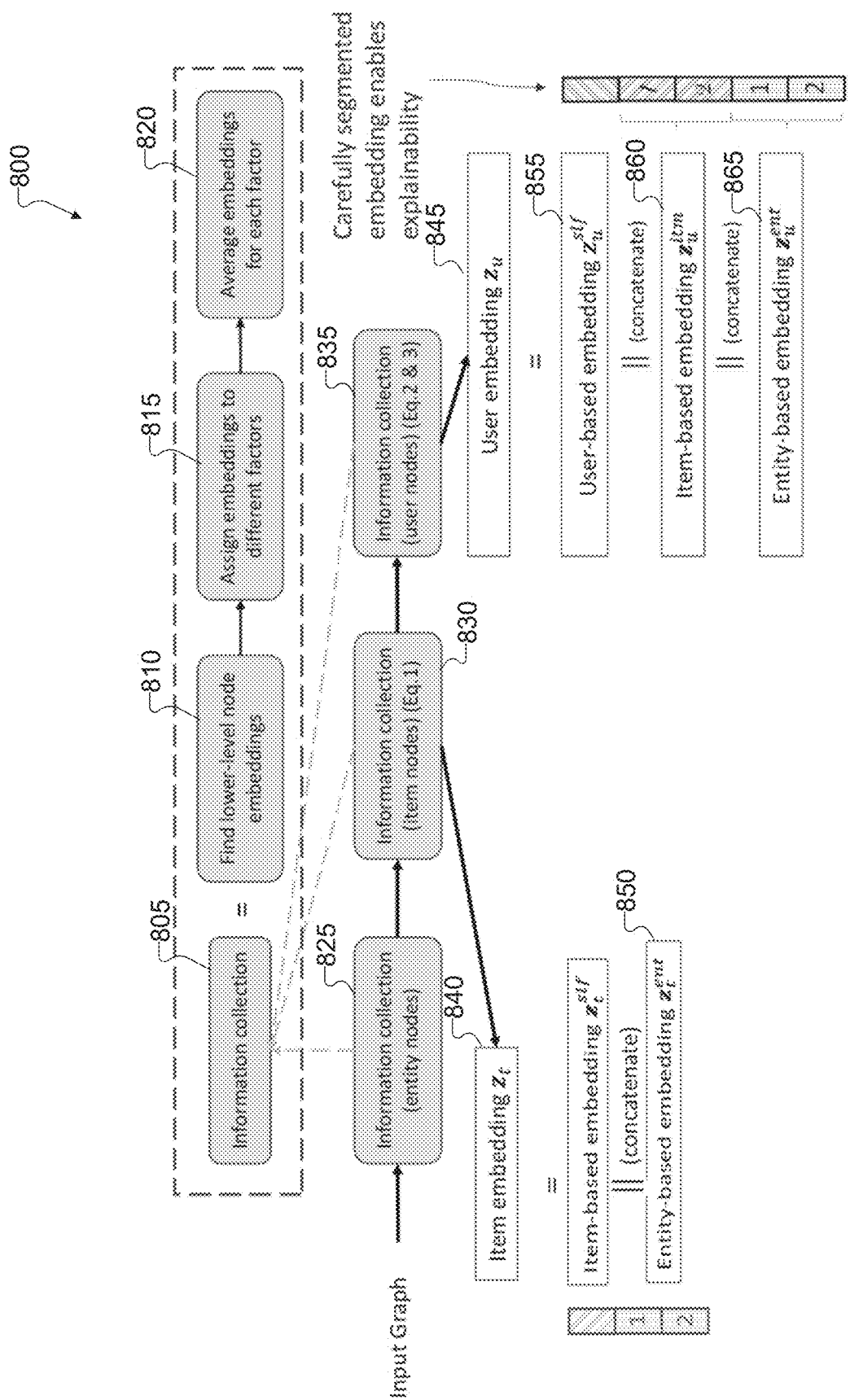
FIG. 8 illustrates an example process for information collection and embedding calculation in accordance with this disclosure.

FIG. 8 illustrates an example process 800 for information collection and embedding calculation in accordance with this disclosure. The embodiment of the process 800 shown in FIG. 8 is for illustration only, and other embodiments could be used without departing from the scope of the present disclosure. In certain embodiments, the process 800 shown in FIG. 8 can correspond to the training of the recommendation model in operation 320.

The server 106 performs information collection 805, which involves finding lower-level embeddings in operation 810, assigning embeddings to different factors in operation 815, and averaging embeddings for each factor in operation 820. Information collection 805 here includes information collection for entity nodes 825, information collection for item nodes 830, and information collection for user nodes 835.

An entity-based item embedding 850 $z_t^{ent}$ has $C_1$ segments, where each segment corresponds to one factor in knowledge graph entities. To obtain an entity-based item embedding 850, the server 106 in operation 815 assigns its connected entity nodes $N_t$ in the input interpretation hierarchy 500 into relevant factors. For each factor, an embedding segment is obtained by averaging entity embeddings $z_e^{slf}$ in a weighted manner in operation 820. The entity-based item embedding 850 is obtained by concatenating embedding segments of all factors.

Item embeddings $z_t$ 840 are obtained using Equation (7) in the information collection for item nodes 830. Additionally, user embeddings $z_u$ 845 are obtained from the information collection for user nodes 835. The user embeddings $z_u$ include three parts: (1) user-based embeddings 855, $z_u^{slf}$; (2) item-based embeddings 860, $z_u^{itm}$; and (3) entity-based embeddings 865, $z_u^{ent}$. The item-based embeddings 860 and entity-based embeddings 865 are obtained in the similar way as $z_t^{ent}$, where item-based embeddings 860 aggregate embeddings from item nodes connected to the user and entity-based embeddings 865 aggregate embeddings from entity nodes connected to the user's connected item nodes.

The server 106 is configured to provide a recommendation, prediction, and explanation for the basis of the recommendation. For example, the server 106 can create an output embedding format, such as one where the output embedding format includes an entity embedding format, an item embedding format, and a user embedding format. The entity embedding format is a d-dimensional dense vector where each element is a real number and d is a hyperparameter that can be tuned based on the dataset. For example, the entity embedding format can be: {0.12, 0.47, 0.06, 0.79, . . . , 0.83}. The item embedding format is a $(C_1+1)\times d$-dimensional dense vector where each element is a real number. For example, the item embedding format can be: {0.28, 0.19, . . . , 0.83, 0.55, 0.16, 0.01, 0.48, . . . , 0.89, 0.32, 0.95} where {0.28, 0.19, . . . , 0.83} are d real numbers and {0.55, 0.16, 0.01, 0.48, . . . , 0.89, 0.32, 0.95} are $C_1\times d$ real numbers. The user embedding format is a $(C_1+C_2+1)\times d$-dimensional dense vector where each element is a real number. For example, the item embedding format can be: {0.28, 0.19, . . . , 0.83, 0.55, 0.16, 0.01, 0.48, . . . , 0.89, 0.32, 0.95, 0.03, 0.56, 0.39, 0.75, 0.11} where {0.28, 0.19, . . . , 0.83} are d real numbers, {0.55, 0.16, 0.01, 0.48, . . . , 0.89, 0.32, 0.95} are $C_1\times d$ real numbers, and {0.03, 0.56, 0.39, 0.75, . . . , 0.11} are $C_2\times d$ real numbers.

Figure 9:
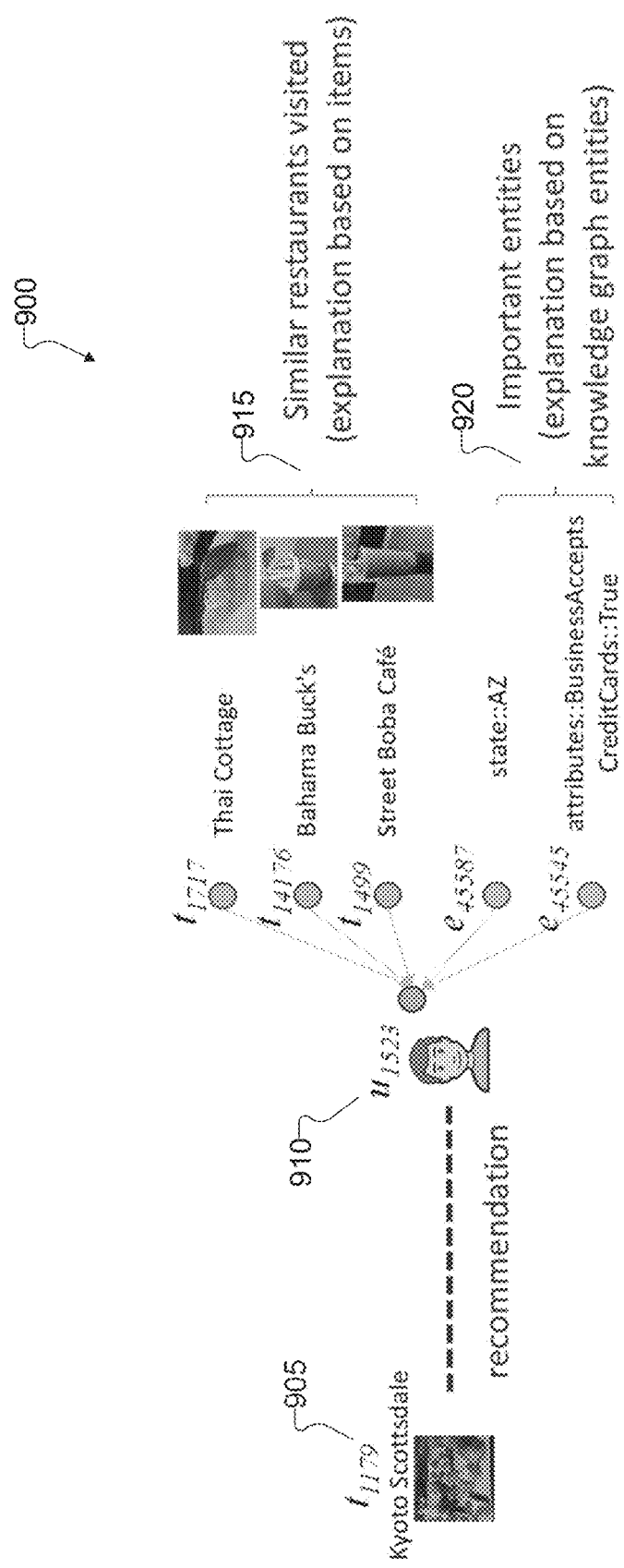
FIG. 9 illustrates an example visual explanation in accordance with this disclosure.

FIG. 9 illustrates an example visual explanation 900 in accordance with this disclosure. The embodiment of the visual explanation 900 shown in FIG. 9 is for illustration only, and other embodiments could be used without departing from the scope of the present disclosure.

In a real-world service, recommendations are normally generated when a user lands on a web page or app page with some slots to display recommendation results. For example, when a user lands on the homepage of NETFLIX, the recommendation system may compute recommended movies for the user in real time. Normally, the recommendation system recommends the most relevant items (e.g., movies) from all available items in the system with which a target user has not interacted with. For each candidate item, the recommendation system computes its similarity with a target user. The recommendation system then sorts all candidate items based on the similarities and recommends the ones with the largest similarities.

Due to the careful segmentation of and disentangled information propagation among different types of concepts (e.g., items and knowledge graph entities), the server 106 is able to use the items previously interacted with by a user and their associated knowledge graph entities (e.g., attributes) to explain the recommendations made to the user in embedding-based recommendation systems, where embeddings are normally very difficult to interpret. In the example shown in FIG. 9, the restaurant Kyoto Scottsdale 905 is recommended to user u1523 910 because of (1) the similar restaurants 915 he previously visited, which provide explanations based on items and (2) important attributes 920 learned from knowledge graph entities (i.e., he is interested in restaurants that are in AZ state and that accept credit cards), which provide explanations based on knowledge graph entities.

Figure 10:
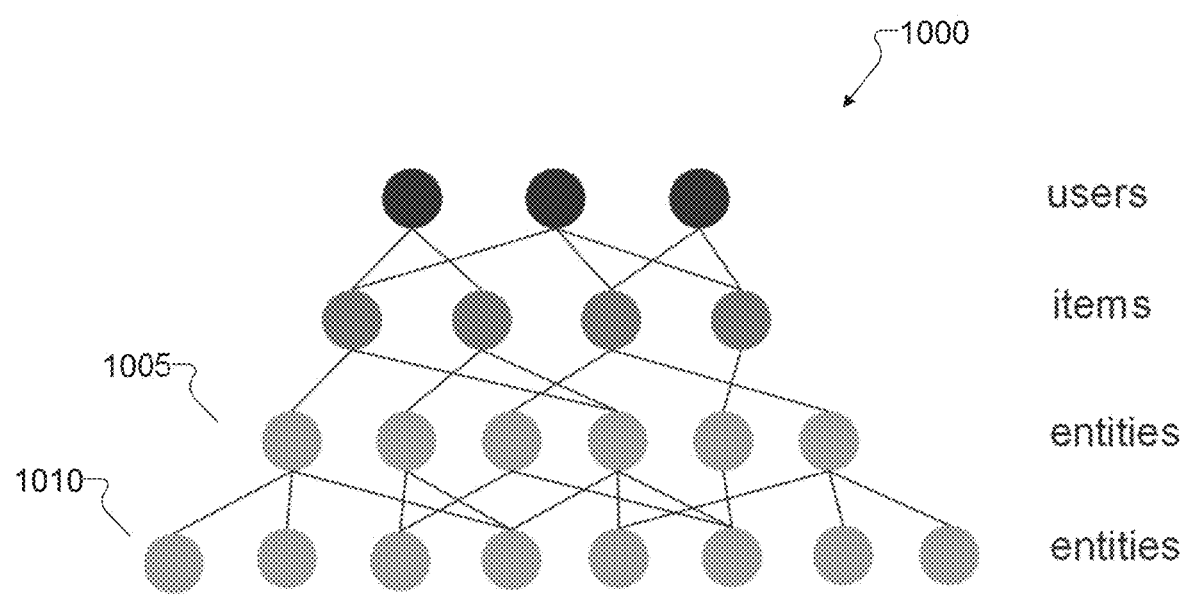
FIG. 10 illustrates an example multi-level knowledge graph in accordance with this disclosure.

FIG. 10 illustrates an example multi-level knowledge graph (KG) 1000 in accordance with this disclosure. The embodiment of the multi-level KG 1000 shown in FIG. 10 is for illustration only, and other embodiments could be used without departing from the scope of the present disclosure.

In certain embodiments, the server 106 creates a multi-level KG 1000 having multi-level KG entities. That is, the multi-level KG 1000 includes a first entity level 1005 and a second entity level 1010. In certain embodiments, the multi-level KG 1000 can include more than two entity levels. In this case, the interpretation hierarchy can have more than three levels. Similarly, in certain embodiments, the server 106 creates an interpretation hierarchy 500 without KG entities. When the server 106 creates an interpretation hierarchy 500 without KG entities, the server 106 only uses the items interacted with by a user to interpret recommendation results.

In certain embodiments, the server 106 uses a mixture of the proposed graph convolution operations and normal graph convolution operations to handle an interpretation hierarchy with multi-level knowledge graph entities. In this case, the embeddings of entity nodes could be learned just via normal GCNs without applying the proposed graph convolution operations because entity nodes in different layers are still of the same type.

Although this disclosure has been described with reference to various example embodiments, various changes and modifications may be suggested to one skilled in the art. It is intended that this disclosure encompass such changes and modifications as fall within the scope of the appended claims.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Though embodiments have been described with reference to certain versions thereof; however, other versions are possible. Therefore, the spirit and scope of the embodiments should not be limited to the description of the preferred versions contained herein.

What is claimed is:

1. An electronic device comprising:
   at least one memory configured to store a database; and
   at least one processor coupled to the at least one memory, the at least one processor configured to:
   obtain an interpretation hierarchy generated based on a knowledge graph and behavioral data;
   train a machine learning model, wherein the at least one processor is configured to:
   collect low-level node embeddings based on the interpretation hierarchy;
   assign the low-level node embeddings to different factors including node type, semantic factors of items, and semantic factors of knowledge graph entities;
   combine the low-level node embeddings for each factor;
   generate, using the combined low-level node embeddings, a plurality of embeddings including user embeddings, item embeddings, and knowledge graph entity embeddings, wherein the user embeddings comprise a concatenation of a user-based embedding, an item-based embedding, and an entity-based embedding; and
   update the machine learning model based on the plurality of embeddings; and
   provide, using the machine learning model, an output and a representation of the output.

2. The electronic device of claim 1, wherein the user embeddings, the item embeddings, and the knowledge graph entity embeddings are generated by graph convolution operations and disposed on different layers within the interpretation hierarchy.

3. The electronic device of claim 2, wherein the item embeddings comprise a concatenation of another item-based embedding and another entity-based embedding.

4. The electronic device of claim 1, wherein the interpretation hierarchy connects to multi-level knowledge graph entities.

5. The electronic device of claim 1, wherein:
   the at least one processor is further configured to provide a prediction; and
   the prediction is a function of an item based embedding component and an entity based embedding component.

6. The electronic device of claim 1, wherein, to generate the plurality of embeddings, the at least one processor is configured to:
   perform a first convolution operation to generate the item entity embeddings and the user embeddings via separating information from different types of nodes; and
   perform a second convolution operation to aggregate the item embeddings and the user embeddings by introducing the semantic factors of the items and the semantic factors of the knowledge graph entities.

7. The electronic device of claim 1, wherein the representation of the output is one or more of a graphic representation, an image representation, or plain text.

8. A method comprising:
   obtaining, by an electronic device, an interpretation hierarchy generated based on a knowledge graph and behavioral data;
   training a machine learning model by:
   collecting low-level node embeddings based on the interpretation hierarchy;
   assigning the low-level node embeddings to different factors including node type, semantic factors of items, and semantic factors of knowledge graph entities;
   combining the low-level node embeddings for each factor;
   generating, using the combined low-level node embeddings, a plurality of embeddings including user embeddings, item embeddings, and knowledge graph entity embeddings, wherein the user embeddings comprise a concatenation of a user-based embedding, an item-based embedding, and an entity-based embedding; and
   updating the machine learning model based on the plurality of embeddings; and
   providing, using the machine learning model, an output and a representation of the output.

9. The method of claim 8, wherein the user embeddings, the item embeddings, and the knowledge graph entity embeddings are generated by graph convolution operations and disposed on different layers within the interpretation hierarchy.

10. The method of claim 9, wherein the item embeddings comprise a concatenation of another item-based embedding and another entity-based embedding.

11. The method of claim 8, wherein the interpretation hierarchy connects to multi-level knowledge graph entities.

12. The method of claim 8, further comprising:
providing, by the electronic device, a prediction;
wherein the prediction is a function of an item based embedding component and an entity based embedding component.

13. The method of claim 8, wherein generating the plurality of embeddings comprises:
performing a first convolution operation to generate the item entity embeddings and the user embeddings via separating information from different types of nodes; and
performing a second convolution operation to aggregate the item embeddings and the user embeddings by introducing the semantic factors of the items and the semantic factors of the knowledge graph entities.

14. The method of claim 8, wherein the representation of the output is one or more of a graphic representation, an image representation, or plain text.

15. A non-transitory machine-readable medium comprising instructions that, when executed by at least one processor of an electronic device, cause the at least one processor to:
obtain an interpretation hierarchy generated based on a knowledge graph and behavioral data;
train a machine learning model, wherein the instructions when executed cause the at least one processor to:
collect low-level node embeddings based on the interpretation hierarchy;
assign the low-level node embeddings to different factors including node type, semantic factors of items, and semantic factors of knowledge graph entities;
combine the low-level node embeddings for each factor;
generate, using the combined low-level node embeddings, a plurality of embeddings including user embeddings, item embeddings, and knowledge graph entity embeddings, wherein the user embeddings comprise a concatenation of a user-based embedding, an item-based embedding, and an entity-based embedding; and
update the machine learning model based on the plurality of embeddings; and
provide, using the machine learning model, an output and a representation of the output.

16. The non-transitory machine-readable medium of claim 15, wherein:
the user embeddings, the item embeddings, and the knowledge graph entity embeddings are generated by graph convolution operations and disposed on different layers within the interpretation hierarchy; and
the item embeddings comprise a concatenation of another item-based embedding and another entity-based embedding.

17. The non-transitory machine-readable medium of claim 15, wherein the interpretation hierarchy connects to multi-level knowledge graph entities.

18. The non-transitory machine-readable medium of claim 17, wherein:
the instructions when executed further cause the at least one processor to provide a prediction; and
the prediction is a function of an item based embedding component and an entity based embedding component.

19. The non-transitory machine-readable medium of claim 15, wherein the instructions that when executed cause the at least one processor to generate the plurality of embeddings comprise instructions that when executed cause the at least one processor to:
perform a first convolution operation to generate the item entity embeddings and the user embeddings via separating information from different types of nodes; and
perform a second convolution operation to aggregate the item embeddings and the user embeddings by introducing the semantic factors of the items and the semantic factors of the knowledge graph entities.

20. The non-transitory machine-readable medium of claim 15, wherein the representation of the output is one or more of a graphic representation, an image representation, or plain text.

* * * * *